United States Patent [19]
Goddard

[11] 3,811,635
[45] May 21, 1974

[54] SPINDLE ADAPTER
[75] Inventor: William H. Goddard, Brockport, N.Y.
[73] Assignee: Eastman Kodak Company, Rochester, N.Y.
[22] Filed: Feb. 15, 1973
[21] Appl. No.: 332,849

[52] U.S. Cl. .......................................... 242/68.3
[51] Int. Cl. ........................................... B65h 17/02
[58] Field of Search ...................... 242/68.3, 71.8 A

[56] References Cited
UNITED STATES PATENTS

| | | | |
|---|---|---|---|
| 3,502,279 | 3/1970 | Bundschuh | 242/68.3 |
| 3,347,485 | 10/1967 | Bundschuh | 242/68.3 |
| 3,375,995 | 4/1968 | Roman | 242/68.3 |
| 3,532,287 | 10/1970 | Patton | 242/68.3 |
| 3,326,489 | 6/1967 | Lessler | 242/68.3 |

Primary Examiner—John W. Huckert
Assistant Examiner—Edward J. McCarthy
Attorney, Agent, or Firm—Lawrence P. Kessler

[57] ABSTRACT

A spindle adapter for selectively accommodating reels having differing central driving core diameters. The spindle adapter, extending through a reel supporting plate, has a body mounted on a spindle drive shaft for rotation therewith and axially movable relative thereto. The body has differing diametral sections corresponding to the diameters of the central driving cores to be accommodated. A spring-biased latch is selectively engageable with the adapter body to position the adapter body axially relative to the plate to properly locate a selected diameter portion of said body to receive a reel of particular core diameter, and to secure the adapter in the established position.

9 Claims, 3 Drawing Figures

PATENTED MAY 21 1974 3,811,635

SPINDLE ADAPTER

BACKGROUND OF THE INVENTION

1. Field of the Invention

This invention relates to reel spindles and more particularly to a manually actuated spindle adapter for selectively accommodating reels having differing central drive core diameters.

2. Description of the Prior Art

For many years the amateur motion picture film market has been generally dependent upon film of the 8mm size. In about 1963 a modified 8mm film called "Super 8" was introduced which has a larger picture area and different perforation spacing from regular 8mm film. Since it is common for a person to have in his film library both regular 8mm and "Super 8" films, it has been necessary to provide projectors capable of handling both film formats. In addition to the noted differences as to picture area and perforation spacing, the two formats are supplied on film reels having central drive cores of differing diameters. Any dual purpose projector must therefore be capable of accommodating either reel core diameter.

The most common mechanism by which dual purpose projectors are rendered capable of accommodating film reel cores of either diameter is by use of a slip-on adapter which is selectively placed on the supply spindle to change the diameter thereof according to the film format and particular core diameter to be used. While such an arrangement is considered the simplest from a design standpoint, the slip-on type adapters require some degree of manual dexterity to be properly placed on the spindle shaft and further are often misplaced since they are not an integral part of the projector and not fixed to the projector in any permanent manner. In order to simplify operator minipulation, and to reduce inconvenience due to lost adapters, multiple core diameter accommodating spindles have been proposed such as that shown in U.S. Pat. No. 3,326,489 issued on June 20, 1967 in the name of Lessler. The Lessler adapter, however, is somewhat more complex than desirable in both construction and operation in that it requires a manually pivoted retainer to lock a reel on the adapter, the retainer being held in its locking position by a ball detent.

SUMMARY OF THE INVENTION

In view of the above, it is a primary object of this invention to provide a novel spindle adapter capable of accommodating reels having central drive cores of differing diameters, the adapter being of simple construction and requiring virtually no mechanical skill to change from one accommodation diameter to another.

Accordingly, this invention herein provides a novel spindle adapter, extending through a reel supporting plate, having an adapter body mounted on a spindle drive shaft for rotation therewith and axially movable relative thereto. The adapter body has differing diametral sections corresponding to the diameters of the reel cores to be accommodated. A sliding latch is selectively engageable with the adapter body to position the adapter body axially relative to the plate to selectively locate a particular diametral portion to receive a reel of a corresponding core diameter and to secure the adapter in the established position to receive the particular diameter core.

PREFERRED EMBODIMENT OF THE INVENTION

Figure 1:
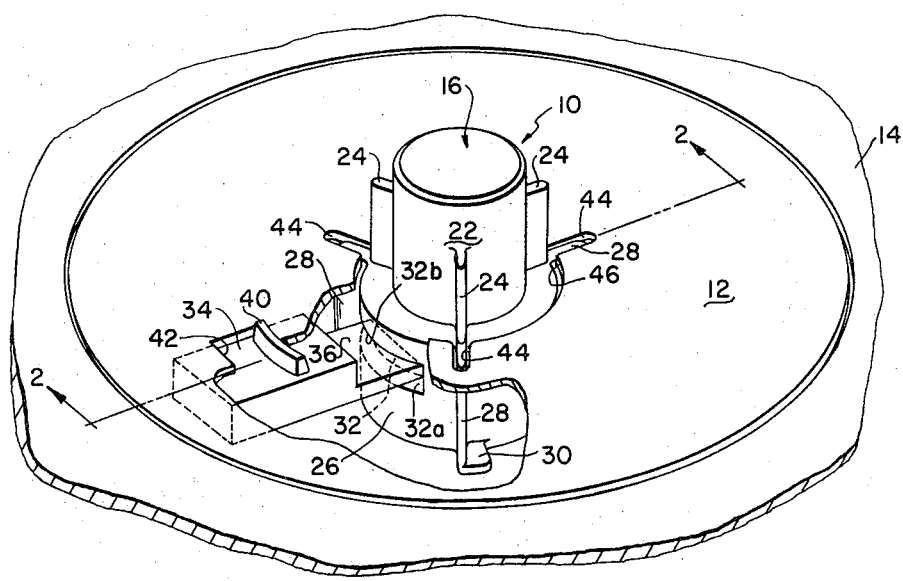
FIG. 1 is a perspective view of the spindle adapter according to this invention.

Referring now to the drawings, a novel spindle adapter 10 according to this invention is shown. The spindle adapter 10 extends through a spindle plate 12 of a dual purpose motion picture projector of well known construction for projecting both regular 8mm and "super 8" film, the projector having a housing 14 which the spindle plate 12 is rotationally mounted. The spindle adapter 10, which may for example be made of hard plastic, has a body 16 mounted on a spindle drive shaft 18. A key 20 positively interconnects the drive shaft 18 and the body 16 for imparting a rotational drive connection while permitting relative axial movement therebetween. The body 16 has a first portion 22 which has a diameter corresponding to the diameter of the central drive core of regular 8mm motion picture film supporting reel. Extending radially from the first portion 22 are spline fingers 24 which are adapted to engage complementary grooves in the standard construction film supporting reel so as to insure positive drive thereof by the spindle adapter 10.

The spindle adapter body 16 further includes a second portion 26 in juxtaposition with portion 22 in a direction along the axis of the body 16. The second portion 26 has a diameter corresponding to the center drive core of a film supporting reel for super 8 motion picture film. Extending radially from the second portion 26 are spline fingers 28 which are adapted to engage complementary shaped grooves in the standard construction super 8 film supporting reel to insure positive drive connection between the film supporting reel and the spindle adapter 10. Each spline finger 28 has a laterally extending tab 30 at the lower portion thereof which may interact with the spindle plate 12 for the purpose of preventing the spindle adapter 10 from being removed from the spindle drive shaft 18 (see FIG. 3). The second portion 26 of the spindle adapter body 16 also includes a locating groove 32, the side walls of which form a cam surface 32a and a positioning surface 32b.

In order to control the position of the body 16 of the spindle adapter 10, a slide latch 34 is provided. The slide latch 34 has a tongue 36 which is selectively engageable with the groove 32 of the second diameter portion 26 of the body 16. The latch 34 is biased by means of a spring, shown schematically as numeral 38, toward a position wherein the tongue 36 is engaged with the groove 32 of the body 16. Along the upper surface of the latch 34 there is a protrusion 40 which extends through an opening 42 in the spindle plate 12. The protrusion 40 is adapted to be engaged manually to selectively control the movement of the latch 34 against the bias of the biasing spring 38. Further, the spindle plate 12 has spline finger accommodating openings 44 (extending radially from a central spindle-accommodating opening 46) which are engaged by the spline fingers 28 to provide positive drive engagement between the spindle adapter 10 and the spindle plate 12.

Figure 2:
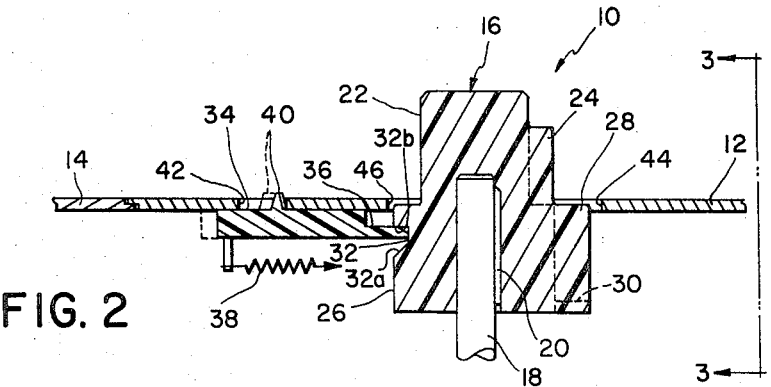
FIG. 2 is a side elevational view of the spindle adapter in a first core diameter accommodating position taken along lines 2—2 of FIG. 1.

With the spindle adapter 10 thus described, the operation thereof is as follows. In a first axial position shown in FIGS. 1 and 2, the spindle adapter 10 is positioned relative to the plate 12 to receive a regular 8 mm film supporting reel. In this position the tongue 36 of the slide latch 34 is biased to its position in the groove 32 of the second portion 26 of the body 16 by the spring biasing means 38. The tongue 36 will support the body 16 by its interaction with the positioning surface 32b of the groove 32. In this first axial position, the spline fingers 24 will be in a position to be received within the complementary grooves of the core of a standard 8mm film supporting reel so as to provide positive drive thereof when the spindle adapter body 16 is rotated by the spindle drive shaft 18 through the key connection 20. The latch 34 holds the body 16 accurately in this first axial position such that the spline fingers 28 will engage the openings 44 of the spindle plate 12 (without extending beyond the surface thereof) in order that the plate 12 will be driven in unison with a film supporting reel placed thereon.

Figure 3:
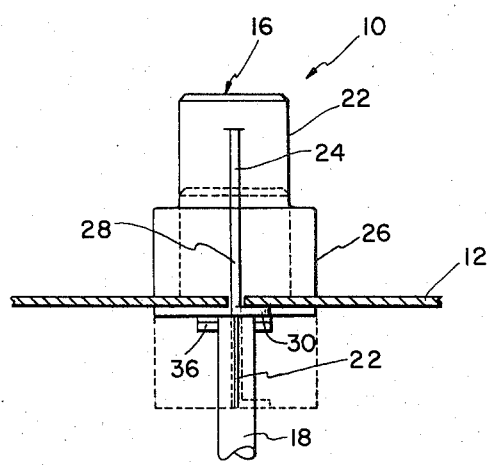
FIG. 3 is a side elevational view of the spindle adapter viewed generally in the direction of arrows 3—3 of FIG. 2 with the adapter being shown in a second core diameter accommodating position (first position shown in phantom).

When it is desired to use the dual purpose motion picture projector to project a film of the "super 8" format, the adapter 10 is moved to a second axial position as shown in FIG. 3 (first axial position shown in dashed lines in this figure). The body 16 is manually urged outwardly of the projector housing 14 and the cam surface side wall 32a of the groove 32 will interact with the tongue 36 to move the latch 34 against the bias of the biasing means 38 (to its phantom position in FIG. 2) in order that the body 16 may be moved to its fully extended position of FIG. 3. The lateral tabs 30 of the splines 28 will prevent the body 16 from being fully withdrawn from the projector housing 14. When the body 16 is in its second axial position, it will be located such that the latch 34 can return to its solid line position of FIG. 2 with the tongue 36 passing beneath the body 16. In this position, the tongue 36 serves as a lower support for the body 16 to maintain it in its second axial position to accommodate the core of the "super 8" film supporting reel. In this second axial position the spline fingers 28 will be in position to be received within complementary grooves of the "super 8" film supporting reel as well as in the grooves 44 on the spindle plate 12 to provide positive drive thereof. To return to the regular 8mm film supporting core accommodating position, the protrusion 40 is manually moved to the phantom position of FIG. 2 which will permit the body 16 to return to its lowered position at which time the tongue 36 of the latch 34 will again be urged to engage the groove 32 by the biasing of spring 38.

From the foregoing it is readily apparent that there is herein provided a novel spindle adapter which will accommodate a plurality of flexible strip supporting reels having differing central drive cores. The spindle adapter, extending through a reel supporting plate, has a body mounted on a spindle drive shaft for rotation therewith and is axially movable relative thereto. A spring-biased latch is provided to selectively engage the adapter body to establish axial positions relative to the reel supporting plate for the body to properly locate the different diameter positions thereof to receive the reel cores of different diameters and to secure the adapter in the established positions.

This invention has been described in detail with reference to preferred embodiments, however, it will be understood that variations and modifications can be affected within the spirit and scope of the invention.

I claim:

1. A spindle adapter for receiving reels having differing diameter drive cores, and for transmitting a driving force thereto from a spindle shaft, said spindle adapter comprising a reel supporting spindle plate, a multi-diameter adapter body extending through said spindle plate, said adapter body being mounted on the spindle shaft for rotation therewith and axial movement relative thereto, means selectively engageable with said adapter body for retaining said adapter body in a selected axial position relative to said spindle plate to receive a reel with a particular diameter drive core, said selected axial position being dependent upon the particular reel core diameter to be accommodated.

2. The structure of claim 1 wherein said multi-diameter adapter body includes a first diametral portion, means extending radially from said first diametral portion for engagement with a first diameter drive core only when said first diametral portion is in a first axial position, a second diametral portion displaced from said first diametral portion in an axial direction, and means extending radially from said second diametral portion for engagement with a second diameter drive core only when said second diametral portion is in a second axial position.

3. The structure of claim 2 wherein said second diametral portion further includes a locating groove to be selectively engaged by said retaining means for establishing said first axial position for said adapter body.

4. The structure of claim 3 wherein said retaining means includes a latch mechanism having a tongue portion for selective engagement with said locating groove, means for biasing said latch mechanism towards said groove and means for enabling said latch mechanism to be moved against the bias of said biasing means away from said locating groove.

5. The structure of claim 4 wherein said locating groove has a first sidewall forming a cam surface cooperating with said tongue of said latching mechanism to move said tongue against the bias of said biasing means when said adapter body is moved from its first axial position, and a second sidewall forming a positioning surface cooperating with said tongue to secure said adapter body in its first axial position.

6. An apparatus capable of accommodating reels respectively having different diameter drive cores, said apparatus comprising: a spindle drive shaft; a spindle plate for supporting a reel, said spindle plate having a central opening therein; an adapter body having axially displaced different diameter sections corresponding respectively to the different reel drive cores to be handled, said adapter body being mounted on said spindle drive shaft for axial movement relative thereto, and extending through said central opening in said spindle plate in driving relationship therewith; latching means selectively engaging said adapter body for locating said adapter body on said drive shaft relative to said spindle plate, the axial position of said adapter body being dependent on the diameter of the drive core of the reel to be handled; and means for keying said adapter body to said spindle drive shaft for rotation therewith.

7. The apparatus of claim 6 wherein said adapter body includes a first diametral portion, spline fingers extending radially from said first diametral portion for driving engagement with complementary shaped slots in a reel having a first size drive core when said adapter body is in a first axial position; and, a second diametral portion, spline fingers extending radially from said second diametral portion for driving engagement with said central opening in said spindle plate and with complementary shaped slots in a support reel having a second size drive core when said adapter body is in a second axial position.

8. The apparatus of claim 7 wherein said spline fingers extending from said second diametral portion have transverse tabs extending from the ends thereof cooperating with said spindle plate when said adapter body is in its second axial position to limit axial movement of said adapter body relative to said spindle plate.

9. The apparatus of claim 7 wherein said second diametral portion has a locating groove and said latch means includes a slide mechanism having a tongue biased towards said locating groove and means for enabling said tongue to be moved against said bias away from said groove.

* * * * *